United States Patent
Hjelmstad et al.

(10) Patent No.: US 9,015,682 B1
(45) Date of Patent: Apr. 21, 2015

(54) COMPUTER CODE TRANSFORMATIONS TO CREATE SYNTHETIC GLOBAL SCOPES

(75) Inventors: John A. Hjelmstad, San Francisco, CA (US); Malte Ubl, San Francisco, CA (US)

(73) Assignee: Google Inc., Mountain View, CA (US)

( * ) Notice: Subject to any disclaimer, the term of this patent is extended or adjusted under 35 U.S.C. 154(b) by 65 days.

(21) Appl. No.: 13/432,477

(22) Filed: Mar. 28, 2012

(51) Int. Cl.
*G06F 9/44* (2006.01)
*G06F 9/54* (2006.01)

(52) U.S. Cl.
CPC ...................... *G06F 9/545* (2013.01)

(58) Field of Classification Search
CPC ....................................... G06F 9/545
USPC ......................................... 717/145
See application file for complete search history.

(56) References Cited

U.S. PATENT DOCUMENTS

| | | | |
|---|---|---|---|
| 6,305,012 B1 | 10/2001 | Beadle et al. | |
| 6,427,234 B1 | 7/2002 | Chambers et al. | |
| 6,842,894 B1 | 1/2005 | Havemose | |
| 7,681,178 B1 | 3/2010 | George et al. | |
| 7,747,749 B1 | 6/2010 | Erikson et al. | |
| 7,865,350 B1 | 1/2011 | Tocci et al. | |
| 8,042,120 B2 * | 10/2011 | Laborczfalvi et al. | 719/320 |
| 8,191,038 B1 * | 5/2012 | Samuel et al. | 717/106 |
| 8,260,964 B2 * | 9/2012 | Marmor | 709/246 |
| 8,407,584 B1 * | 3/2013 | Boodman et al. | 715/234 |
| 2002/0095666 A1 | 7/2002 | Tabata et al. | |
| 2003/0132922 A1 | 7/2003 | Philipp | |
| 2004/0103368 A1 | 5/2004 | Liu et al. | |
| 2006/0031663 A1 | 2/2006 | Peller et al. | |
| 2006/0059462 A1 | 3/2006 | Yamamoto | |
| 2006/0136815 A1 | 6/2006 | Jung et al. | |
| 2006/0271287 A1 * | 11/2006 | Gold et al. | 701/211 |
| 2007/0022411 A1 | 1/2007 | Tromey | |
| 2007/0199000 A1 | 8/2007 | Shekhel et al. | |
| 2008/0092109 A1 | 4/2008 | Kinnucan et al. | |
| 2008/0127233 A1 | 5/2008 | Neil et al. | |
| 2008/0147371 A1 | 6/2008 | Gupton et al. | |
| 2008/0256469 A1 | 10/2008 | Jain et al. | |
| 2009/0327955 A1 | 12/2009 | Mouilleseaux et al. | |
| 2010/0079394 A1 | 4/2010 | Tanaka et al. | |
| 2010/0125835 A1 | 5/2010 | Kandasamy et al. | |
| 2010/0149091 A1 | 6/2010 | Kota et al. | |
| 2010/0251228 A1 | 9/2010 | Mercer et al. | |

(Continued)

OTHER PUBLICATIONS

Google, Closure Compiler (2009), retrieved from http://closure-compiler.appspot.com/home on Oct. 1, 2013.*

(Continued)

*Primary Examiner* — Don Wong
*Assistant Examiner* — Theodore Hebert
(74) *Attorney, Agent, or Firm* — McDermott Will & Emery LLP

(57) ABSTRACT

Methods and systems for processing computer code modules in order to avoid polluting the global namespace. According to one embodiment, the system or method comprises a server that receives a request for an additional computer code module to be added to the namespace. Prior to delivering the module, the server processes the module by identifying all references to global symbols that are not to be explicitly exported to a global scope and moving the identified symbols to a synthetic namespace prior. The server further wraps the processed module in a function that receives the synthetic global scope as a parameter, and delivers the wrapped module to the requesting namespace.

20 Claims, 7 Drawing Sheets

(56) References Cited

U.S. PATENT DOCUMENTS

| | | | |
|---|---|---|---|
| 2011/0041140 A1* | 2/2011 | Harm et al. | ............... 719/318 |
| 2011/0061007 A1 | 3/2011 | Shah et al. | |
| 2011/0078670 A1 | 3/2011 | Viry | |
| 2011/0113409 A1 | 5/2011 | Evans et al. | |
| 2011/0161941 A1 | 6/2011 | Thomson et al. | |
| 2012/0169646 A1 | 7/2012 | Berkes et al. | |
| 2012/0260181 A1 | 10/2012 | Sule et al. | |
| 2012/0272132 A1 | 10/2012 | Mondal et al. | |
| 2013/0014092 A1 | 1/2013 | Hiniker | |
| 2013/0061128 A1 | 3/2013 | Lucco et al. | |
| 2013/0295534 A1 | 11/2013 | Meiri | |
| 2013/0304798 A1 | 11/2013 | Chang et al. | |

OTHER PUBLICATIONS

Mock, Using IIFEs in JavaScript to control variable scope (Oct. 11, 2011), retrieved from http://tech.myemma.com/iifes-javascript-control-variable-scope/ on Oct. 1, 2013.*

Cherry, JavaScript module Pattern: In-Depth, Adequately Good Decent Programming Advice (Mar. 12, 2010), retrieved from http://www.adequatelygood.com/JavaScript-Module-Pattern-In-Depth.html on Sep. 10, 2014.*

Santos, Closure Compier (Sep. 22, 2010), retrieved from http://www.google.com/url?sa=t&rct=j&q=&esrc=s&frm=1&source=web&cd=1&cad=rja&ved=0CCsQFjAA&url=http%3A%2F%2Fclosure-compiler.googlecode.com%2Ffiles%2Fclosure-compiler-ast.pdf&ei=2uxKUpQyrMLgA7KHgZAG&usg=AFQjCNE__4QNm7odoLjCTORmaG5cReaR3Sw& bvm=bv.53371865,d.dmg on October.*

"JavaScript: export statement", w3resource, retrieved from <http://www.w3resource.com/javascript/statements/export.php>, visited Feb. 3, 2012.

"Using JavaScript code modules—MDN", retrieved from <https://developer.mozilla.org/en/JavaScript_code_modules/Using>, visited Feb. 3, 2012.

"Scope (computer science)", retrieved from <http://en.wikipedia.org/wiki/Scope_(computer_science), visited Nov. 28, 2011.

"Closure Complier (Labs)", Google code labs, retrieved from <http://code.google.com/closure/compiler>, visited Nov. 28, 2011.

"Javascript Closures", retrieved from <http://jibbering.com/faq/notes/closures>, visited Nov. 28, 2011.

Perry, "System Compositions and Shared Dependencies," System Configuration Management, ICSE'96 SCM-6 Workshop, Berlin, Germany, Mar. 25-26, 1996, Proceedings. Lecture Notes in Computer Science 1167 Springer 1996, pp. 139-153.

IEEE 100 The Authoritative Dictionary of IEEE Standards Terms, $7^{th}$ Edition, Dec. 2000, The institute of Electrical and Electronics Engineering, Inc., p. 202.

* cited by examiner

No Incremental Loading

Incremental Loading Via Global Namespace

COMPUTER CODE TRANSFORMATIONS TO CREATE SYNTHETIC GLOBAL SCOPES

The present specification relates generally to transforming computer code, and more particularly to computer code transformations that facilitate incremental loading of modules from a module set without polluting the global namespace.

BACKGROUND

To assist in the efficient operation of a complex program, a technique referred to as "lazy loading" is used. Lazy loading defers initialization of an object until the point at which it is needed. Another aspect of computer programming that requires consistency for the effective deployment of a program is that of a namespace. A namespace (sometimes also called a name scope) is an abstract container or environment created to hold a logical grouping of unique identifiers or symbols (i.e., names). An identifier defined in a namespace is associated only with that namespace.

One aspect of lazy loading and minification is that all namespaced identifiers are flattened to reside in a single namespace. Therefore, when using a lazy loading technique, the namespace must be the global namespace in order to be accessible across individually loaded modules.

When code resides on many web pages on the Internet, the risks of namespace collision is heightened. In addition, as developers release future versions of a program that add one or more identifiers would potentially create other unexpected problems. Polluting the global namespace can further lead to hard-to-debug errors.

SUMMARY OF THE INVENTION

It is therefore a principal object and advantage of the present invention to provide a tool, system, and method that transforms code to permit lazy loading of modules with shared dependencies between them with consistent minification.

It is another object of the present invention to reduce global namespace pollution and prevent namespace collisions.

It is a further object and advantage of the present invention to provide a tool, system, and method that permits determination of the exact time when newly loaded code is evaluated, thereby enabling parallel, non-redundant loading when users request multiple features in short order.

Other objects and advantages of the present invention will in part be obvious and in part appear hereinafter.

In accordance with the foregoing objects and advantages, the present invention provides a system, tool, and method for transforming code, such as JavaScript, to facilitate incremental loading of modules from a module set without polluting the global namespace through the creation of synthetic global scopes. An embodiment of the present invention creates an automated transformation of JavaScript code that moves all global symbols that are not explicitly exported to a synthetic global scope. In so doing, the embodiment of the present invention traverses an abstract syntax tree of a given JavaScript program and replaces every reference to a global symbol to be a property access of the name of the synthetic global scope object. An embodiment of the present invention identifies and distinguishes explicit references from implicit reference by traversing the abstract syntax tree and rewriting all references that are not default exports in the global object (i.e., WINDOW in JavaScript) to be property lookups on a synthetic scope object. The JavaScript payload is then wrapped in functions that receive the synthetic scope as a parameter/argument and then passes that to a callback. Therefore, all payloads will have access to the same synthetic scope, and no symbols are involuntarily leaked into the global scope of a host page.

Embodiments of the present invention comprise systems and methods for processing a computer code payload. According to one embodiment, a method comprises the steps of: (i) receiving a request for a computer code payload; (ii) obtaining the requested computer code payload which has a plurality of global symbols; (iii) identifying which of the plurality of global symbols are not designated to be explicitly exported to a global scope; (iv) moving all identified global symbols to a synthetic global scope; (v) wrapping the processed computer code payload in a function that receives the synthetic global scope as a parameter; and (vi) delivering the wrapped payload.

Yet another embodiment comprises a method for processing a JavaScript module at a module server comprising the steps of: (i) receiving at a module server a request for a JavaScript module; (ii) obtaining the requested JavaScript module at the module server, where the JavaScript module has a plurality of global symbols; (iii) identifying which of the plurality of global symbols are not designated to be explicitly exported to a global scope; (iv) replacing each reference to an identified global symbol to be a property access of the synthetic global scope object; (v) recompiling the JavaScript module; (vi) wrapping the processed JavaScript module in a function that receives the synthetic global scope as a parameter; and (vii) delivering the wrapped JavaScript module.

In another implementation, a non-transitory computer-readable storage medium containing program code for receiving a request for a computer code payload; program code for obtaining the requested computer code payload where the computer code payload has a plurality of global symbols; program code for identifying which of the plurality of global symbols are not designated to be explicitly exported to a global scope; program code for moving all identified global symbols to a synthetic global scope; program code for wrapping the processed computer code payload in a function that receives the synthetic global scope as a parameter; and program code for delivering the wrapped payload.

A further embodiment comprises a system for processing a computer code module by a computer processor, the system comprising: (i) a computer network; (ii) a computerized device connected to the computer network and comprising a global namespace; (ii) a computer processor connected to the computer network and the global namespace. The computer processor delivers to the global namespace a requested module, which in turn comprises one or more global symbols. The computer processor processes the requested module prior to delivery to the global namespace by identifying which of the one or more global symbols are not designated to be explicitly exported, moving each identified global symbol to a synthetic global scope, and wrapping the modified module in a function that receives the synthetic global scope as a parameter.

BRIEF DESCRIPTION OF THE DRAWINGS

The present invention will be more fully understood and appreciated by reading the following Detailed Description in conjunction with the accompanying drawings, in which.

DETAILED DESCRIPTIONS

Figure 1:
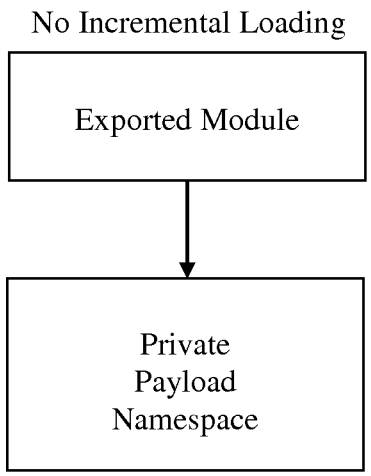
FIG. 1 is a block diagram of an example software configuration that loads code payloads at one time in a private namespace.
Figure 2:
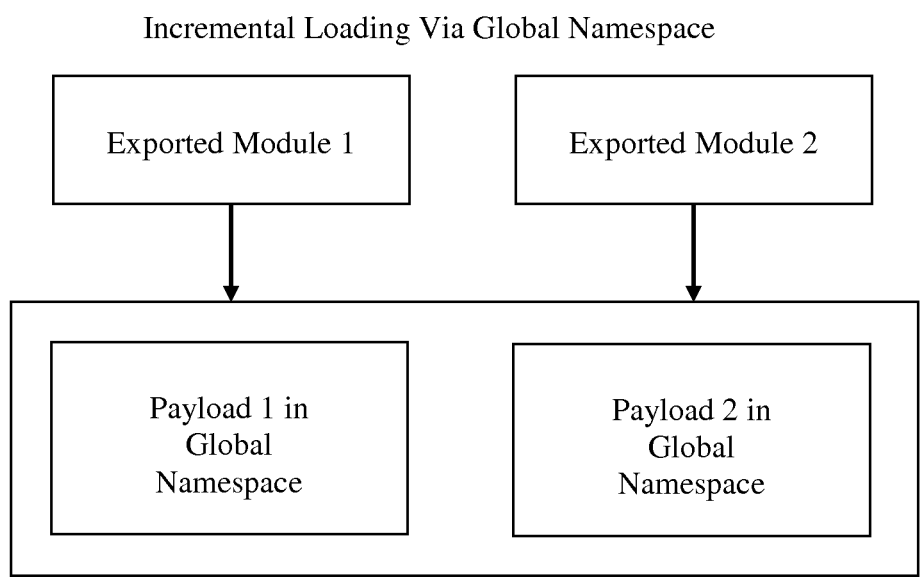
FIG. 2 is a block diagram of an example software configuration that incrementally loads code payloads in a global namespace.
Figure 3:
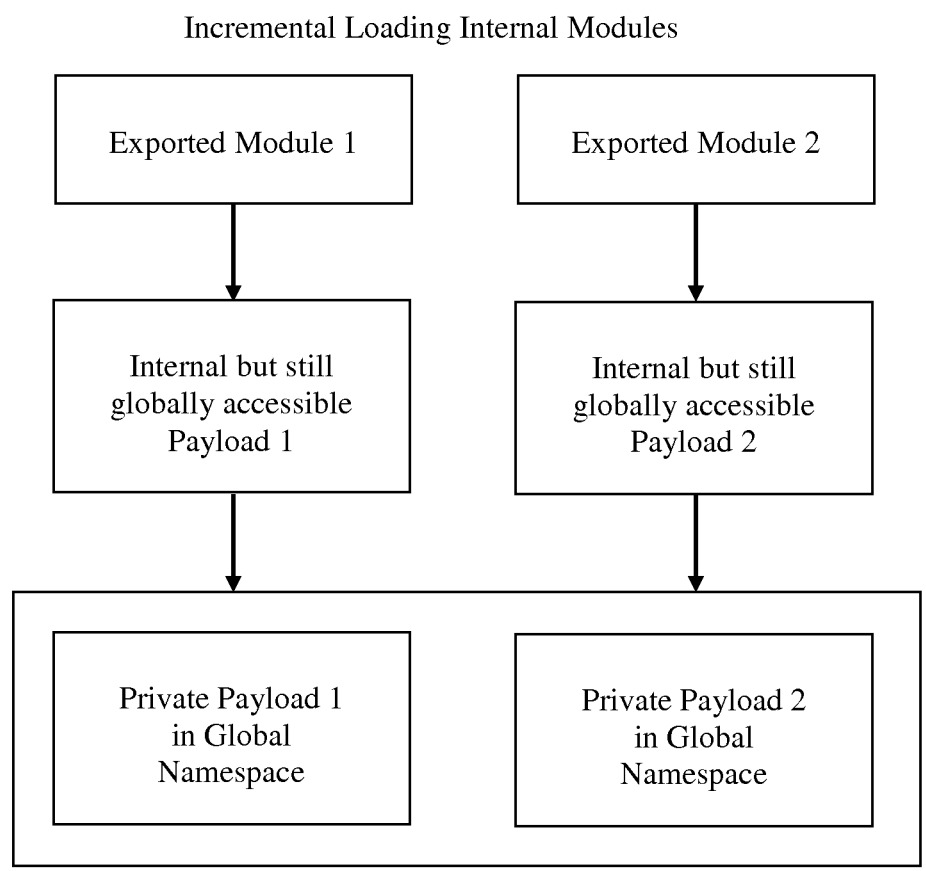
FIG. 3 is a block diagram of an example software configuration that incrementally loads code payloads in a global namespace using a linker to ambiguate between internal application program interfaces and external application program interfaces.

Referring now to the drawings, wherein like reference numerals refer to like parts throughout, there is seen in FIGS. 1-3 configurations of loading, incrementally and all at once, code payloads according to various methods previously known in the art. In FIG. 1 an application programming interface ('API') is exported and delivers a payload that is contained within a private namespace. In this configuration, all objects in the program payload will be initialized at one time when the API is exported, but is done within a private network such that the payload will not become publically accessible.

In the configuration of FIG. 2, two APIs are exported at different times (such as when they are needed), thereby delaying the initialization of the objects in the accompanying payloads that each reside in the global namespace. However, in this configuration (as compared to the one show in FIG. 1), the payloads are publically accessible on the third party computers that have requested their delivery.

In the configuration of FIG. 3, two APIs are first exported internally to a marshalling layer that is internal but still provides APIs that are accessible by third parties to deliver payloads but will remain private due to the use of a traditional linker program, thereby minimizing some of the payload's footprint.

Exemplary Module Processing Methods

Figure 4:
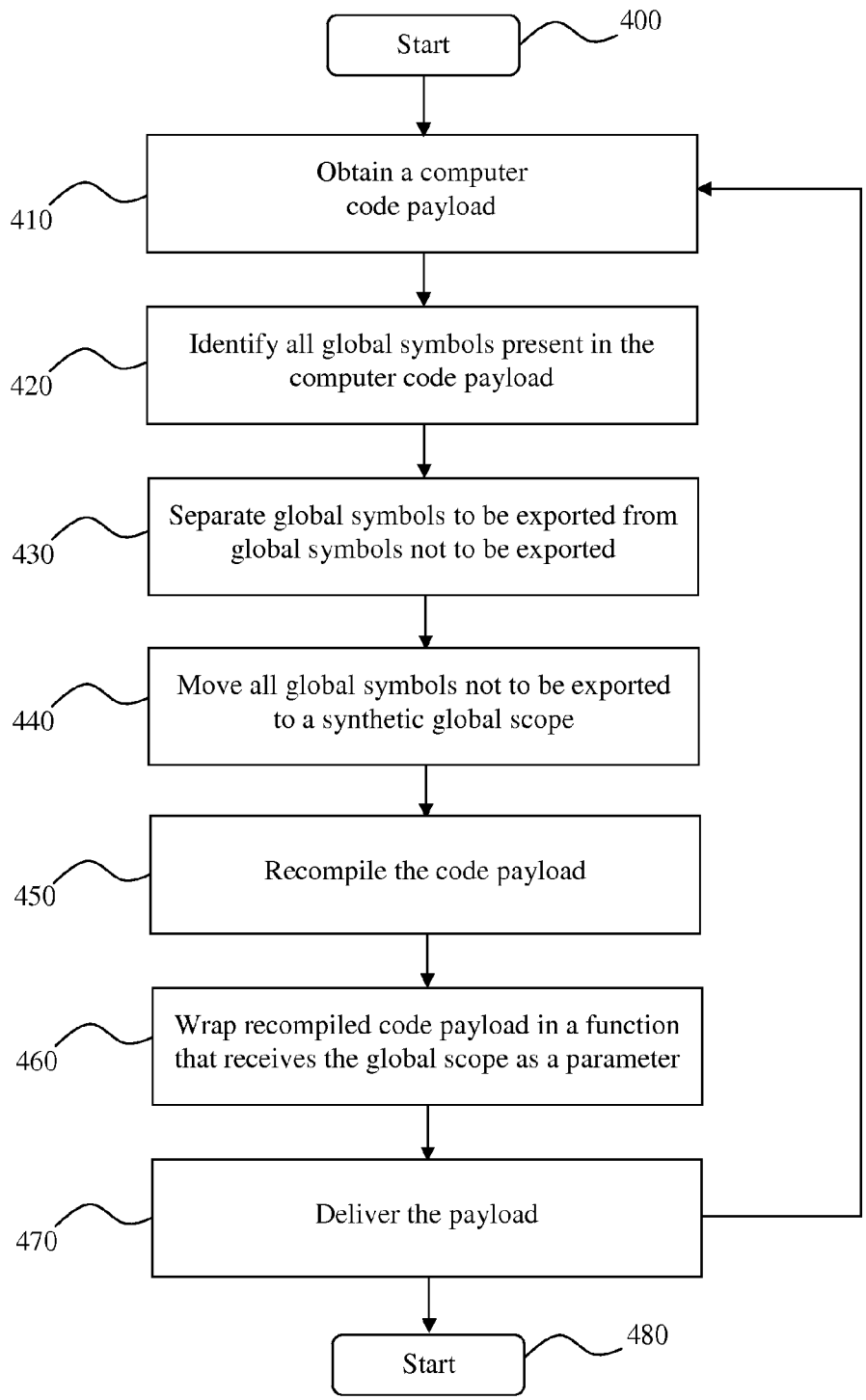
FIG. 4 is a flow chart illustrating the module processing method according to an example.
Figure 7:
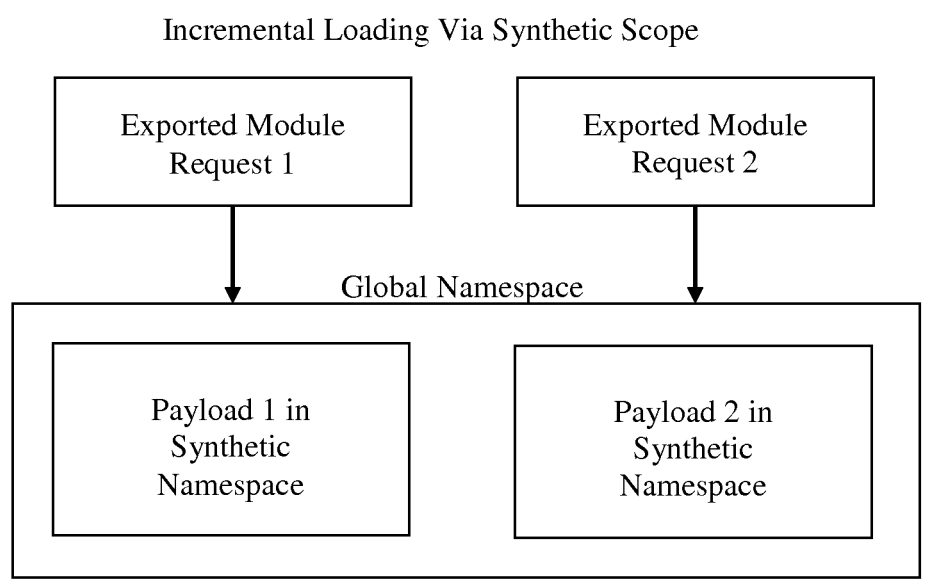
FIG. 7 is a block diagram of a software configuration according to an example that incrementally loads code payloads in a synthetic scope.
Figure 8:
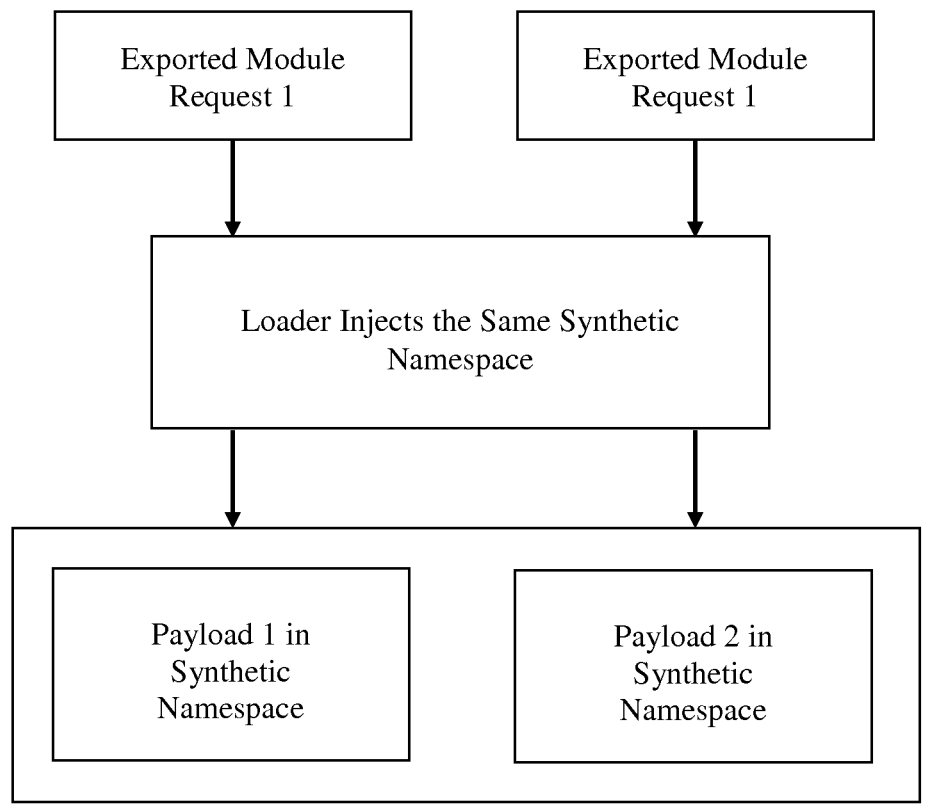
FIG. 8 is a block diagram of a software configuration according to an example that incrementally loads code payloads in a synthetic namespace using a client side loader.

FIGS. 4, 7, and 8 illustrate high-level overviews of methods for transforming code according to embodiments of the invention. At step 400 of the method, there is a request for a module. This could be, for example, a request from a client device, server, or anything running or comprising a program or code for communicating with and/or requesting a module, including but not limited to a web page requesting a module from a module server in response to a user action, although there are many other ways for requesting and/or delivering code known in the art, including automated requests for code, timed requests for code, requests for code that are responsive to an event, action, or motion, and many other modes of requesting or delivering code. The module, in turn, can be a script, function, module, or other discrete unit of code. For example, the module can be a JavaScript function.

According to one embodiment, a client device comprising a browser with a loaded web page running one or more JavaScript modules requests an additional JavaScript module from the module server that is in communication with the client device and browser via a network such as the Internet. A loaded and executing JavaScript module, for example, tells the module server that it needs the code for executing a specific action prompted by a user event.

At step 410, a server-side component such as a module server gathers the requested module (the "payload") from memory, receives it from another device or server, or otherwise obtains the module from a source. Once the payload is obtained, it can be processed at step 420 of the method. At this step, the payload is analyzed, using any of a number of methods well-known in the art, to identify all the global symbols (or "variables") present in the code. Global symbols can be any symbol or variable that is meant to exist outside the specific payload, thus being accessible by other modules in the overall system. When a module such as a JavaScript module is loaded into a system such that it will or might interact with other modules in that system, it can both export and import any variables that it designates—and/or variables that the other modules/functions already extant in the system designate—as being globally accessible. Since they are accessible by each module in the system, these exported and imported variables are termed global symbols, in comparison with local symbols which are only found and used inside a single module. Local variables live and die with the function in which they are incorporated. While global variables are not used excessively because they can cause conflicts between modules in a namespace (for example, module A exports global variable X to the global namespace, and module B is then loaded into the same global namespace and exports a second global variable X, thereby polluting the global namespace), they can be an important aspect of a program. Indeed, global variables are often created as a result of namespace flattening during minification which can turn all previously namespaced symbols into global symbols.

Once the possible global variables in the payload are identified, they are categorized at step 440 of the method into at least two different categories: (i) global variables that are explicitly exported by the module; and (ii) global variables that are not explicitly exported by the module. Note that this categorization may be an action such as creating two lists in memory rather than any physical segregation, among many other methods of categorization.

The global variables that are explicitly exported by the module can be exported, processed, renamed, or otherwise handled following any one of a number of known methods in the art. For example, the explicitly exported global variables can simply be exported without any further processing (which may significantly increase the possibility of namespace pollution). In another embodiment, the explicitly exported global variables are all renamed to avoid conflicts between the global symbols and other code in first and third-party sites. While this prevents many conflict scenarios, the need to keep the prefix short to save bytes and reducing network transmission time opens up the change for future collisions.

At step 440 of the method, all global symbols that are not explicitly exported are moved to a synthetic global scope, and at step 450 the module is recompiled. To accomplish this step, the system can, for example, traverse an abstract syntax tree ("AST") of the program and replace every reference to a global symbol that is not to be explicitly exported to be a property access of the name of the synthetic global scope object, although there are several other methods of replacing references known in the art. For example:

var a=1; function b( ) {return a}</pre>
becomes
NS.a=1; NS.b=function b( ) {return NS.a}
where NS is the synthetic global scope.

At step 460 of the method, the processed payload can be wrapped in a function that receives the synthetic scope as a parameter using any of a number of methods. As just one example, code that originally reads as follows prior to being processed according to one embodiment of the present method:
  function GP_a(a) {
    ...}
  var GP_b=123;
could be transformed to read as follows after running the transforming program:
  Xapi_loaded ('module_set/name', function(global1) {
    //this===window
    global1.a=function(a) {
    ...
    }
    global1.b=123;});
where "global1" is the synthetic global scope.

All payloads in the system processed by the method described herein will therefore have access to the same synthetic scope (and the symbols exported thereto), and no symbols will be involuntarily leaked into the existing global scope of the system. In other words, the scope object ("global1" in the above example) will be shared between individually loaded modules, thus providing the desired access to dependencies in previously loaded modules. Since the scope object is not referred to be name (e.g., it only has to be lexically visible to the Xape_loaded function as in the example above), and thus does not leak into user space.

Finally, at step 470 of the method, the processed payload is delivered to the requestor using any one of a number of known methods and systems in the art.

As an additional step in the process, and using methods known in the art, the transforming program (or another program or module) can also perform code minification. Often, JavaScript minification with property collapsing tries to move all symbols into one scope level. In order for different payloads to access that scope level, especially in the context of deferred loading, the scope is by necessity the global scope, which results in numerous symbols spilling into the global scope. This can create issues if multiple modules reside in the same namespace, especially if the namespace is a web page containing any number of other modules from any number of third parties. Using the methods and systems of the present invention, however, code minification can be accomplished without moving all symbols into a single scope level and therefore without polluting the scope level. For example, the global variable can be minified to only 1 byte, thereby saving 1 byte per variable use against current methods, which is using a prefix on every global identifier in order to prevent collisions and pollution of the namespace.

According to another embodiment of the method, the module server can be extended to accept a callback parameter such as the following:
  cb=Xapi_loaded
Notably, the name of the callback is preferably always the same in order to improve the cacheability of requests.

An additional option that could be incorporated into the transforming program is to call the callback with more parameters in order to support dual inclusion scenarios where different versions of the same module could reside together in a global namespace. For example:
  Xapi_loaded('module_set/name', 'version', 'module_mods', function(global1) {
    //this===window
    global1.a=function(a) {
    ...
    }
    global1.b=123;});

In addition, known global variables could also be passed to the code callback, thereby enabling cross-friendly-frames, sometimes called "same-origin frames," reuse of the same JavaScript code: For example:
  Xapi_loaded('module_set/name', function(global1, window, document) {
    //this===a Window
    global1.a+function(a) {
    ...
    }
    global1.b=123;})

Figure 5:
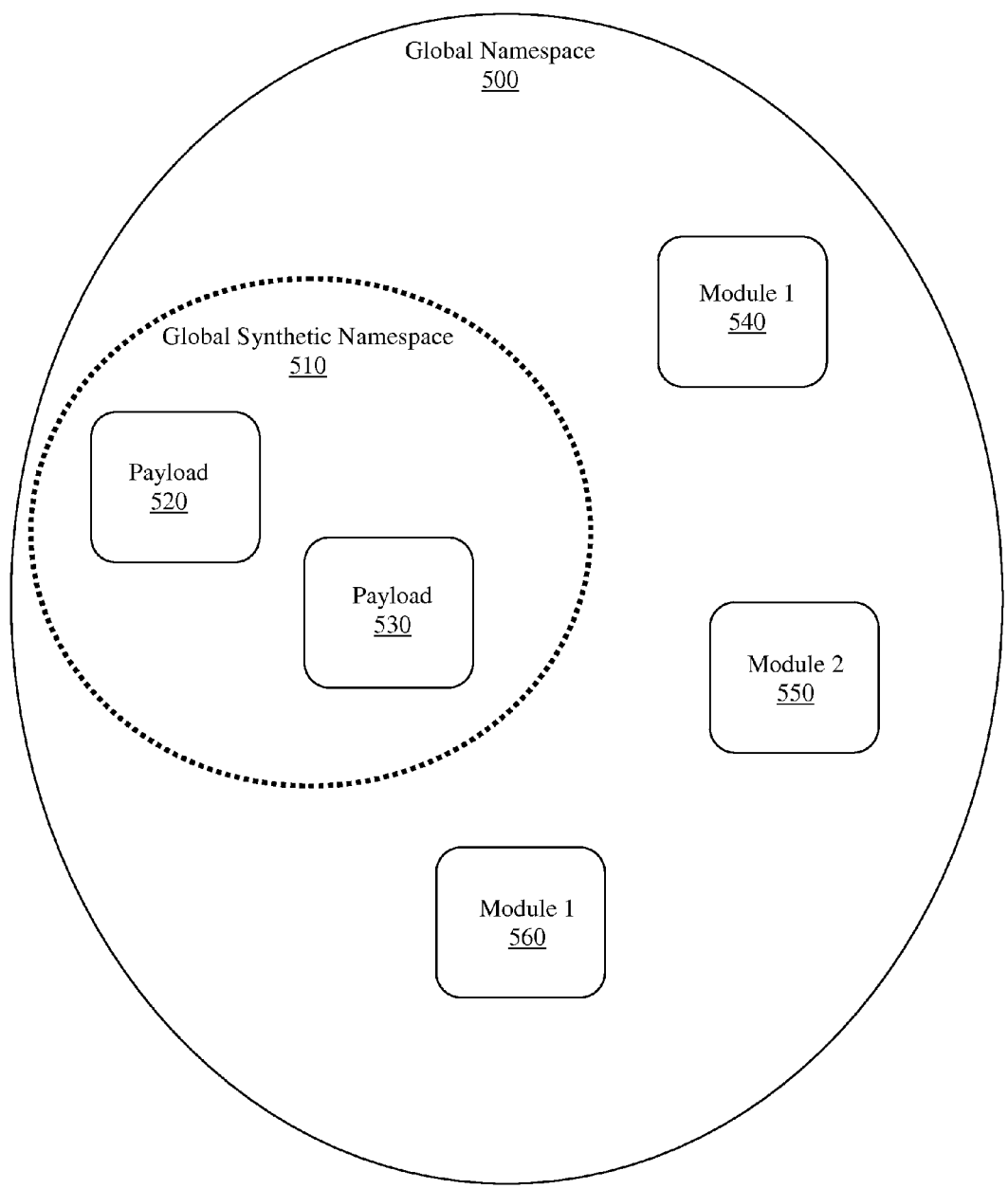
FIG. 5 is a schematic diagram of a synthetic namespace inside a global namespace, both containing modules, according to an example.

FIG. 5 is a schematic depiction of a global namespace according to one embodiment of the invention. It should be noted that this schematic depiction is only a two-dimensional representation of a global namespace. It can represent, for example, a web page comprising several different modules, such as a web page loaded into a browser and comprising several JavaScript modules.

Initially, global namespace 500 comprises the three modules 540, 550, and 560. An additional module is then requested by the system, possibly in response to an automated feature or some user action. The system sends the request to a module server requesting the module, and the module server performs one or more of the following steps of the method described herein to process the payload, including but not limited to: (i) gathering, retrieving, or receiving the requested payload at or by the module server; (ii) processing the payload to identify all global symbols; (iii) categorizing all the global symbols; (iv) moving to a synthetic global scope all global symbols that are not explicitly exported; and (v) wrapping the processed payload in a function that receives the synthetic scope as a parameter. The processed payload can then be delivered to the requesting system using any one of a number of known methods and systems in the art.

For example, the system in FIG. 8 has requested and received two additional modules, Payload 520 and Payload 530, which exist inside the synthetic global namespace 510. Both Payload 520 and Payload 530 have access to the global variables defined inside synthetic global namespace 510, as well as the global variables defined inside global namespace 500. An actual global namespace or synthetic global namespace can have more modules than are shown in FIG. 5, and there can further be more synthetic global namespaces inside global namespace 500.

As shown in FIG. 7, which uses one or more of the methods described or suggested herein, the APIs can be exported incrementally and the payloads that are delivered upon request will be inside the synthetic scope instead of the global scope.

In FIG. 8, a client-side loader incrementally loads code payloads in a synthetic namespace using one or more of the methods suggested or described herein. The client-side loader injects the same synthetic namespace into each module requested and incrementally loaded into the system.

Exemplary Module Processing Systems

Figure 6:
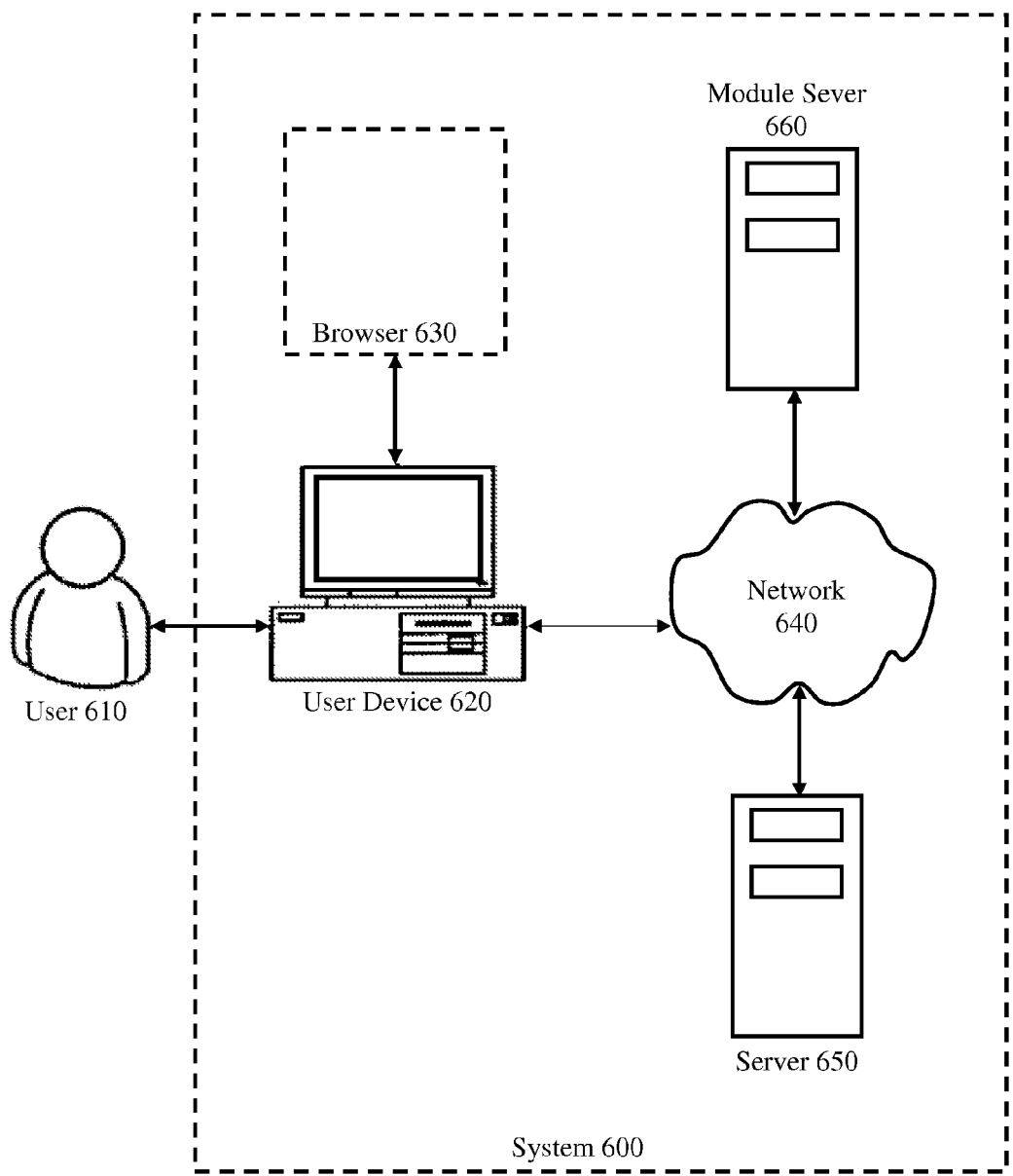
FIG. 6 is a diagram of an example module processing.

FIG. 6 is a schematic drawing of a system 600 in which module processing method can operate according to one embodiment of the method. System 600 comprises, for example, a network 640 that connects user device 620 to a local or remote sever 650 and a local or remote module server 660. Network 640 can be any suitable wired or wireless network capable of transmitting communication, including but not limited to a telephone network, Internet, Intranet, local area network, Ethernet, online communication, offline communications, wireless communications and/or similar communications means. User device 620 is preferably any device capable of running, mirroring, displaying, or otherwise interacting with software requiring multiple database transaction requests. This includes, but is not limited to, desktops, laptops, tablets, personal digital assistants, personal digital devices, cellular phones, mobile computers, netbooks, smartphones, pocket computers, and handheld computers, among many others. In other words, user device 620 can be any device comprising a processor and a network connection.

By way of example, user device 620 can comprise a software or program component such as a web browser 630. Browser 630 is designed to enable user 610 to access, retrieve, and view resources and documents, including resources and documents found on the Internet or an Intranet, among other sources. For example, the browser can be designed for viewing an Intranet within an organization, or any other connection of local computers.

System 600 may also comprise only user device 620 and a software or program component. In this system, the software or program component which is the web browser in the embodiment described above is designed for viewing locally-stored files. In this embodiment, system 600 and the methods described herein are used to manage the local database without a network connection, or without accessing an available network connection.

According to one embodiment of the invention, the browser loads a web page or program via communication with server 650 over network 640. In response to an action by user 610, or an action or inquiry initiated by some other component of system 600, the browser requests an additional module from module server 660 via communication over network 640. Module server 660 processes the requested module using any of the methods described or envisioned herein, and sends it to user device 620 and the browser via the network.

Although the present invention has been described in connection with a preferred embodiment, it should be understood that modifications, alterations, and additions can be made to the invention without departing from the scope of the invention as defined by the claims.

What is claimed is:

1. A method comprising:
   receiving a request for a computer code payload;
   obtaining the requested computer code payload, the computer code payload having a plurality of global symbols;
   identifying the plurality of global symbols in the computer code payload and creating a first list of global symbols from among the plurality of global symbols that are not designated to be explicitly exported to a global scope and a second list of global symbols from among the plurality of global symbols that are designated to be explicitly exported to the global scope, wherein the first list and the second list are stored in a memory;
   moving the global symbols of the first list of global symbols to a synthetic global scope within the global scope while foregoing moving the global symbols of the second list of global symbols to the synthetic global scope, wherein the synthetic global scope is associated with a scope object that is shared between individually loaded modules in the global scope, provides access to dependencies in the global scope, and is lexically visible from the individually loaded modules, and
   wherein moving the global symbols of the first list of global symbols comprises:
      traversing an abstract syntax tree of the computer code payload,
      changing each reference to the global symbols of the first list of global symbols to be a property access of the scope object, and
   recompiling the computer code payload;
   wrapping the computer code payload in a function that receives the scope object as a parameter; and
   transmitting the wrapped computer code payload.

2. The method of claim 1, wherein the recompiled computer code payload further includes a callback parameter.

3. The method of claim 2, wherein the callback parameter is uniform among a plurality of recompiled computer code payloads.

4. The method of claim 2, wherein the callback parameter is modified to support at least two different versions of the computer code payload in a single namespace.

5. The method of claim 2, wherein the callback parameter further comprises a global variable.

6. The method of claim 1, wherein the method is performed by a client-side processor.

7. The method of claim 1, wherein the computer code payload is written in a modular computer programming language.

8. The method of claim 7, wherein the modular computer programming language is JavaScript.

9. A method for processing a JavaScript module at a module server, the method comprising:
   receiving, at a module server, a request for a JavaScript module;
   obtaining the requested JavaScript module at the module server, the JavaScript module having a plurality of global symbols;
   identifying the plurality of global symbols in the JavaScript module and creating a first list of global symbols from among the plurality of global symbols that are not designated to be explicitly exported to a global scope and a second list of global symbols from among the plurality of global symbols that are designated to be explicitly exported to the global scope, wherein the first list and the second list are stored in a memory;
   changing each reference to each global symbol of the first list of global symbols to be a property access of a scope object associated with the synthetic global scope, while foregoing changing each reference to each global symbol of the second list of global symbols to be the property access of the scope object, wherein the scope object is shared between individually loaded modules in the global scope, provides access to dependencies in the global scope, and is lexically visible from the individually loaded modules, and
   wherein changing each reference to each global symbol of the first list of global symbols comprises traversing an abstract syntax tree of the JavaScript Module;
   recompiling the JavaScript module;
   wrapping the JavaScript module in a function that receives scope object as a parameter; and
   delivering the wrapped JavaScript module.

10. The method of claim 9, wherein the recompiled JavaScript module further includes a callback parameter.

11. The method of claim 10, wherein the callback parameter is uniform among a plurality of recompiled JavaScript modules.

12. The method of claim 10, wherein the callback parameter is modified to support at least two different versions of the JavaScript module in a single namespace.

13. The method of claim 10, wherein the callback parameter further comprises a global variable.

14. A non-transitory computer-readable storage medium comprising instructions for:
- receiving a request for a computer code payload;
- obtaining the requested computer code payload, the computer code payload having a plurality of global symbols;
- identifying the plurality of global symbols in the computer code payload and creating a first list of global symbols from among the plurality of global symbols that are not designated to be explicitly exported to a global scope and a second list of global symbols from among the plurality of global symbols that are designated to be explicitly exported to the global scope, wherein the first list and the second list are stored in a memory;
- moving the global symbols of the first list of global symbols to a synthetic global scope within the global scope while foregoing moving the global symbols of the second list of global symbols to the synthetic global scope, wherein the synthetic global scope is associated with a scope object that is shared between individually loaded modules in the global scope, provides access to dependencies in the global scope, and is lexically visible from the individually loaded modules, and
- wherein moving the global symbols of the first list of global symbols comprises:
  - traversing an abstract syntax tree of the computer code payload,
  - changing each reference to the global symbol of the first list of global symbols to be a property access of the scope object, and
  - recompiling the computer code payload;
- wrapping the computer code payload in a function that receives the scope object as a parameter; and
- for delivering the wrapped computer code payload.

15. The non-transitory computer-readable storage medium of claim 14, wherein the recompiled computer code payload further includes a callback parameter.

16. The non-transitory computer-readable storage medium of claim 14, wherein the computer code payload is written in a modular computer programming language.

17. The non-transitory computer-readable storage medium of claim 16, wherein the modular computer programming language is JavaScript.

18. A system for processing a computer code module, the system comprising:
- a data store in communication with a network and comprising a global namespace;
- a processor in communication with the network and the global namespace, wherein the processor delivers to the global namespace a requested module, the requested module comprising a plurality of global symbols;
- wherein the processor processes the requested module prior to delivery to the global namespace by identifying the plurality of global symbols in the requested module and creating a first list of global symbols from among the plurality of global symbols that are not designated to be explicitly exported to a global scope and a second list of global symbols from among the plurality of global symbols that are designated to be explicitly exported to the global scope, wherein the first list and the second list are stored in a memory, and wherein the synthetic global scope is associated with a scope object that is shared between individually loaded modules, including the requested module, in the global scope, provides access to dependencies in the global scope, and is lexically visible from the individually loaded modules, moving the global symbols of the first list of global symbols to a synthetic global scope within the global scope while foregoing moving the global symbols of the second list of global symbols to the synthetic global scope, wherein moving the global symbols of the first list of global symbols comprises traversing an abstract syntax tree of the requested module, and changing each reference to the global symbols of the first list of global symbols to be a property access of the scope object, and recompiling the requested module, and wrapping the requested module in a function that receives the scope object as a parameter.

19. The system of claim 18, wherein the processor resides at a module server.

20. The system of claim 18, wherein the processor is a client-side processor.

* * * * *